(12) United States Patent
Champavere

(10) Patent No.: US 10,637,571 B2
(45) Date of Patent: *Apr. 28, 2020

(54) WAVELENGTH IDENTIFICATION AND ANALYSIS SENSOR

(71) Applicant: VIAVI SOLUTIONS INC., San Jose, CA (US)

(72) Inventor: Andre Champavere, Saint-Bonnet les Oules (FR)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,177

(22) Filed: Sep. 3, 2019

(65) Prior Publication Data

US 2019/0393955 A1 Dec. 26, 2019

Related U.S. Application Data

(63) Continuation of application No. 16/224,552, filed on Dec. 18, 2018, now Pat. No. 10,425,157, which is a
(Continued)

(51) Int. Cl.
*H04B 10/079* (2013.01)
*H04J 14/02* (2006.01)
(Continued)

(52) U.S. Cl.
CPC ..... *H04B 10/07957* (2013.01); *H04B 10/071* (2013.01); *H04B 10/075* (2013.01);
(Continued)

(58) Field of Classification Search
CPC .......... H04B 10/07957; H04B 10/2504; H04B 10/572; H04B 10/071; H04B 10/075; H04J 14/0227
(Continued)

(56) References Cited

U.S. PATENT DOCUMENTS 5,907,417 A 5/1999 Darcie et al.
7,035,544 B1 4/2006 Won
(Continued)

OTHER PUBLICATIONS fs.com, "Affordable 10G Network Over CWDM up to 18 Channels", posted on Jul. 20, 2016 by fs.com, 3 pages. Retrieved on Mar. 22, 2017. <http://www.fs.com/blog/affordable-10g-network-over-cwdm-up-to-18-channels.html>.
(Continued)

*Primary Examiner* — Juan A Torres
(74) *Attorney, Agent, or Firm* — Mannava & Kang, P.C.

(57) ABSTRACT

According to examples, a wavelength identification and analysis sensor may include a wavelength transmitter, operably connectable to an input or output of a wavelength selective device of a wavelength division multiplex (WDM) network, to transmit test signals on a plurality of wavelengths into the input or output of the wavelength selective device of the WDM network. A wavelength analyzer is to detect returned signals from the input or output of the wavelength selective device of the WDM network, with each returned signal being associated with one of the transmitted test signals. Further, the wavelength analyzer is to analyze the returned signals and identify, based on the analysis of the returned signals, a wavelength associated with the input or output of the wavelength selective device of the WDM network.

14 Claims, 15 Drawing Sheets

Related U.S. Application Data continuation of application No. 15/397,864, filed on Jan. 4, 2017, now Pat. No. 10,181,900.

(51) Int. Cl.
  *H04B 10/075* (2013.01)
  *H04B 10/25* (2013.01)
  *H04B 10/071* (2013.01)
  *H04B 10/572* (2013.01)

(52) U.S. Cl.
  CPC ....... *H04B 10/2504* (2013.01); *H04B 10/572* (2013.01); *H04J 14/0227* (2013.01)

(58) Field of Classification Search
  USPC .......................................... 398/34
  See application file for complete search history.

(56) References Cited

U.S. PATENT DOCUMENTS

| | | |
|---|---|---|
| 2004/0151494 A1 | 8/2004 | King et al. |
| 2006/0007426 A1 | 1/2006 | Weller |
| 2007/0036543 A1 | 2/2007 | Weaver |
| 2008/0008417 A1 | 1/2008 | Gilbert et al. |
| 2008/0052583 A1 | 2/2008 | Matteson et al. |
| 2008/0309925 A1 | 12/2008 | Abbott |
| 2009/0263123 A1 | 10/2009 | Zhu et al. |
| 2011/0116799 A1 | 5/2011 | Effenberger |
| 2011/0206367 A1 | 8/2011 | Gilbert et al. |
| 2012/0082469 A1 | 4/2012 | Xia et al. |
| 2013/0051791 A1 | 2/2013 | Zhao et al. |
| 2014/0072296 A1 | 3/2014 | Montalvo Garcia et al. |
| 2016/0191154 A1 | 6/2016 | Lin et al. |
| 2017/0085318 A1 | 3/2017 | Ruchet et al. |

OTHER PUBLICATIONS

"Series G: Transmission Systems and Media, Digital Systems and Networks: Transmission media and optical systems characteristics—Characteristics of optical systems; Spectral grids for WDM applications:DWDM frequency grid", ITU-T, Telecommunication Standardization Sector of ITU, G.694.1, dated Feb. 2012, 16 pages.

Bernier, "Case study: live monitoring of DWDM network" Optical Society of America, 2000, 4 pages.

Yuksel, "Optical layer monitoring in passive optical networks (PONs) a review", ICTON 2008, 7 pages.

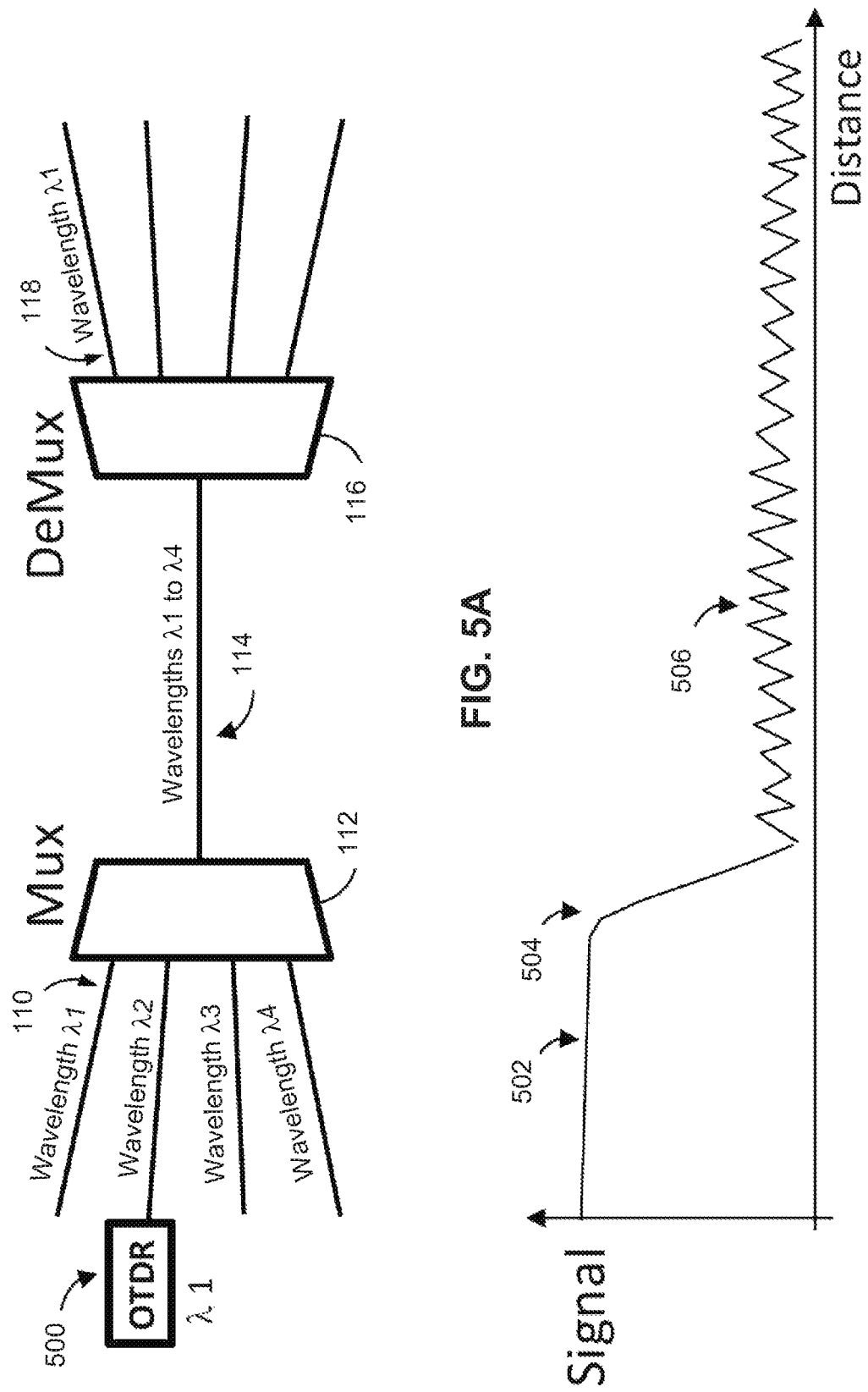

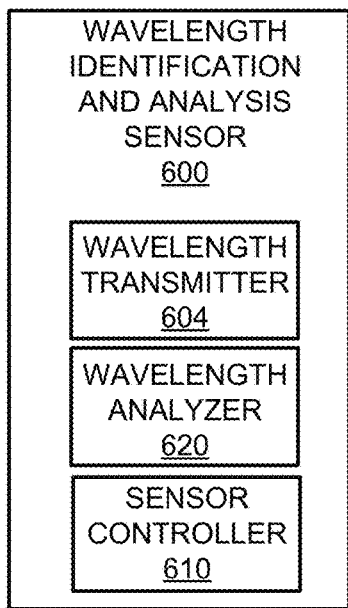
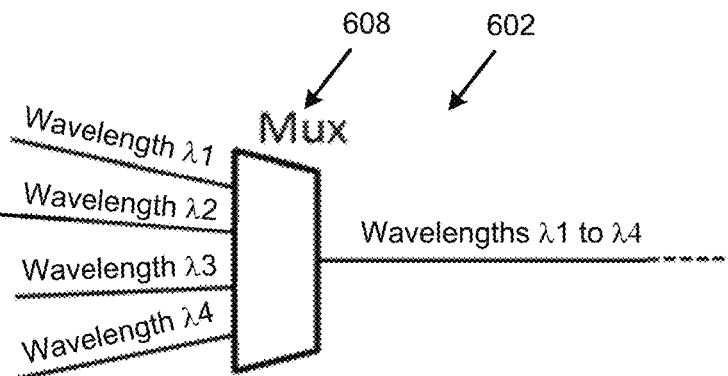
FIG. 6A
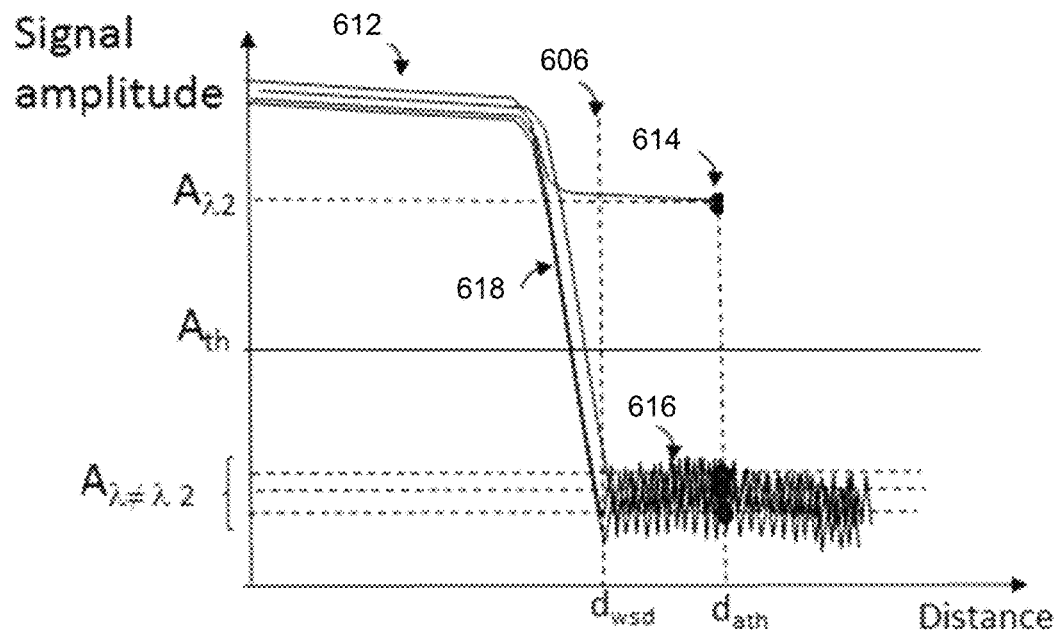
FIG. 6B

1300

TRANSMIT TEST SIGNALS ON A PLURALITY OF WAVELENGTHS INTO THE INPUT OR OUTPUT OF THE WAVELENGTH SELECTIVE DEVICE OF THE WDM NETWORK
1302

DETECT RETURNED SIGNALS FROM THE INPUT OR OUTPUT OF THE WAVELENGTH SELECTIVE DEVICE OF THE WDM NETWORK, EACH RETURNED SIGNAL ASSOCIATED WITH ONE OF THE TRANSMITTED TEST SIGNALS
1304

ANALYZE THE RETURNED SIGNALS BY DETERMINING INSERTION LOSS VALUES ASSOCIATED WITH THE RETURNED SIGNALS
1306

IDENTIFY, BASED ON THE ANALYSIS OF THE RETURNED SIGNALS, A WAVELENGTH ASSOCIATED WITH THE INPUT OR OUTPUT OF THE WAVELENGTH SELECTIVE DEVICE OF THE WDM NETWORK
1308

```
TRANSMIT TEST SIGNALS ON A RANGE OF WAVELENGTHS INTO A
CHANNEL UNDER TEST OF A WAVELENGTH DIVISION MULTIPLEX (WDM)
NETWORK
1402
             │
             ▼
DETECT RETURNED SIGNALS FOR EACH OF THE TRANSMITTED
TEST SIGNALS
1404
             │
             ▼
ANALYZE THE RETURNED SIGNALS
1406
             │
             ▼
IDENTIFY, BASED ON THE ANALYSIS OF THE RETURNED SIGNALS, A
WAVELENGTH ASSOCIATED WITH THE CHANNEL UNDER TEST OF THE
WDM NETWORK
1408
```

FIG. 14

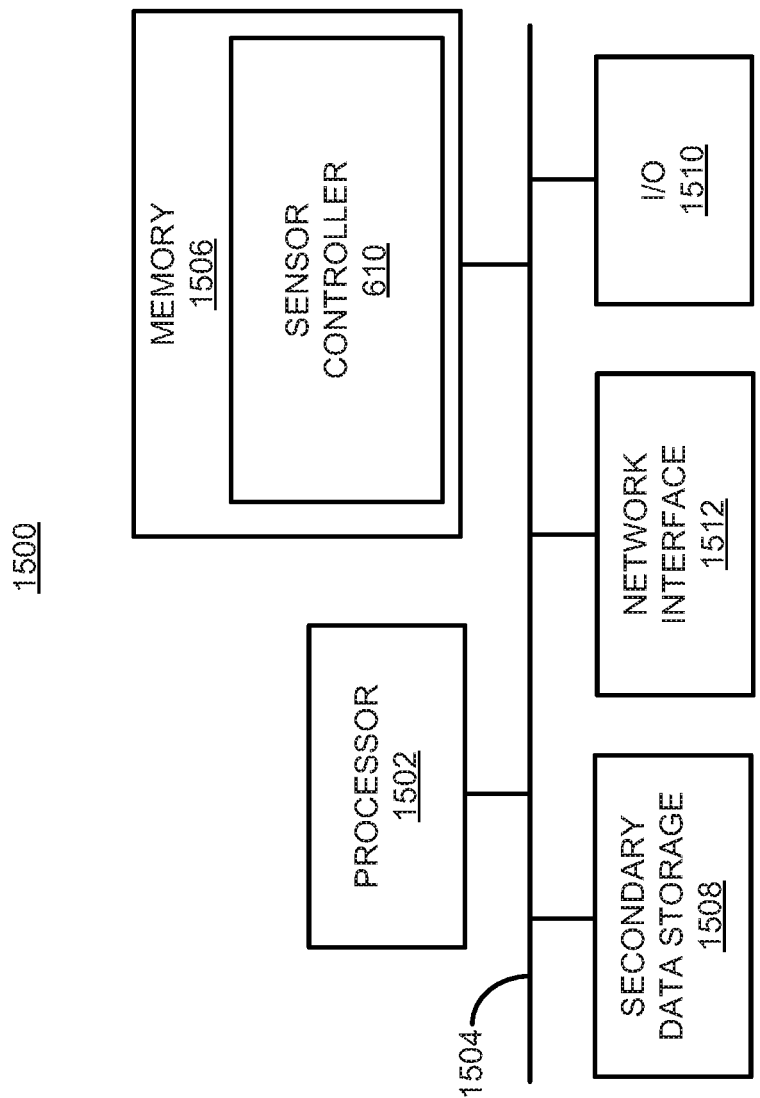

WAVELENGTH IDENTIFICATION AND ANALYSIS SENSOR

PRIORITY

This application is a Continuation of commonly assigned and co-pending U.S. patent application Ser. No. 16/224,552 filed Dec. 18, 2018, which is a Continuation of commonly assigned U.S. patent application Ser. No. 15/397,864, filed Jan. 4, 2017, now U.S. Pat. No. 10,181,900 issued Jan. 15, 2019, the disclosures of which are hereby incorporated by reference in their entireties.

BACKGROUND

With respect to fiber optic communication, wavelength division multiplex (WDM) networks may use two or more wavelengths such as coarse wavelength division multiplexing (CWDM), dense division multiplexing (DWDM), DWDM over CWDM, WDM PON (Passive Optical Network), shortwave wavelength division multiplexing (SWDM), or combinations thereof. A variety of techniques may be used to install, commission, troubleshoot, and/or monitor WDM networks.

BRIEF DESCRIPTION OF DRAWINGS

Features of the present disclosure are illustrated by way of examples shown in the following figures. In the following figures, like numerals indicate like elements, in which:

FIGS. 5A and 5B illustrate wavelength mismatch between an optical reflectometer signal and a channel under test, where the signal of the optical reflectometer is blocked or strongly attenuated by a multiplexer, according to an example of the present disclosure;

FIG. 6A illustrates an architecture of a wavelength identification and analysis sensor, and FIG. 6B illustrates detection of wavelength mismatch by measuring the signal amplitude at one point and comparing the amplitudes, according to an example of the present disclosure;

FIG. 13 illustrates a flowchart of a method for wavelength identification and analysis, according to an example of the present disclosure;

FIG. 14 illustrates another flowchart of a method for wavelength identification and analysis, according to an example of the present disclosure; and FIG. 15 illustrates a computer system, according to an example of the present disclosure.

DETAILED DESCRIPTION

Figure 1:
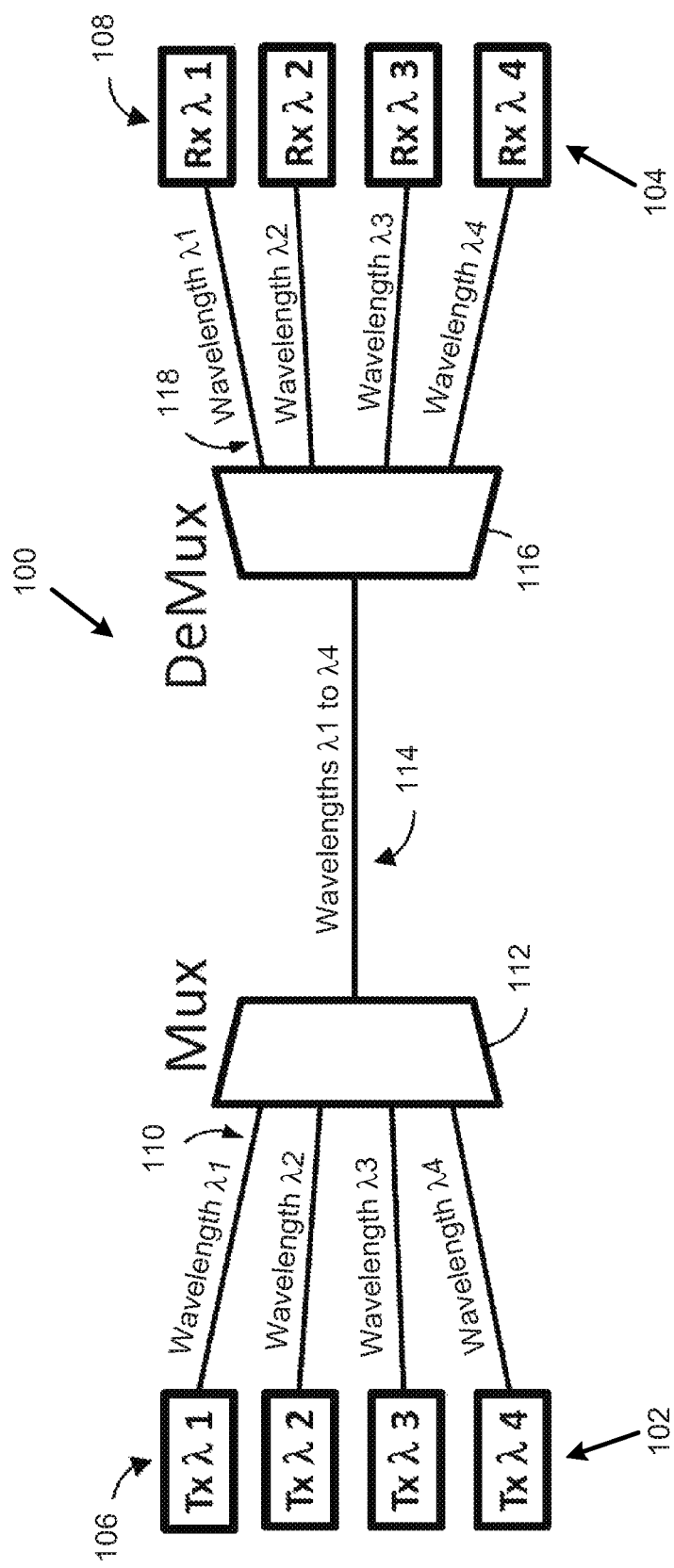
FIG. 1 illustrates an architecture of a wavelength division multiplex (WDM) network including receivers located on the same side, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples of the present disclosure, a wavelength identification and analysis sensor may represent a single end wavelength identification system that uses a multi-wavelength or wavelength tunable reflectometer connected to one end of a wavelength selective device of a WDM network for transmitting the wavelength range of the WDM spectrum. Further, the wavelength identification and analysis sensor may analyze the signal returned by the wavelength selective device to identify the wavelength associated with an input or output of the wavelength selective device to which the wavelength identification and analysis sensor is connected.

According to examples of the present disclosure, the wavelength identification and analysis sensor may provide a single end sensor and/or an associated method to identify wavelength of a wavelength division multiplexing system, using multi-wavelength or tunable optical reflectometry, by transmitting different wavelengths and analyzing returned signals from over a distance location of wavelength selective devices to detect the wavelength associated with an input or output of a wavelength selective device (or a channel under test).

According to examples of the present disclosure, the wavelength identification and analysis sensor may provide a single end sensor and/or an associated method to set-up wavelength of an optical reflectometer connected to a wavelength division multiplexing system, based on multi-wavelength or tunable optical reflectometry, by transmitting different wavelengths and analyzing returned signals from over a distance location of wavelength selective devices to detect the wavelength associated with an input or output of a wavelength selective device (or a channel under test).

According to examples of the present disclosure, the wavelength identification and analysis sensor may provide a single end sensor and/or an associated method to measure optical spectral profile of a closest wavelength selective device of a wavelength division multiplexing system, using multi-wavelength or tunable optical reflectometry, by transmitting different wavelengths and analyzing returned signals from over a distance location of wavelength selective devices.

According to examples of the present disclosure, the wavelength identification and analysis sensor may provide a sensor and/or an associated method to identify wavelength mismatch between a test wavelength (i.e., a test signal) of a multi-wavelength or tunable optical reflectometer and a wavelength associated with an input or output of a wavelength selective device (or a channel under test) of a wavelength division multiplexing system, using multi-wavelength or tunable optical reflectometry, by transmitting different wavelengths and analyzing returned signals from over a distance location of wavelength selective devices.

According to examples of the present disclosure, the wavelength identification and analysis sensor may provide a single end sensor and/or an associated method to differentiate a loss issue at an input of a wavelength division multiplexing system from a wavelength mismatch between a test wavelength (i.e., a test signal) of a multi-wavelength or tunable optical reflectometer and a wavelength associated with an input or output of a wavelength selective device (or a channel under test) of a wavelength division multiplexing system, using multi-wavelength or tunable optical reflectometry, by transmitting different wavelengths and analyzing returned signals from over a distance location of wavelength selective devices.

According to examples of the present disclosure, the wavelength identification and analysis sensor may provide a sensor and/or an associated method to measure separately the optical spectral profile of a multiplexer and a de-multiplexer of a wavelength division multiplexing system, using multi-wavelength or tunable optical reflectometry, by transmitting on each side, different wavelengths and analyzing returned signals from over a distance location of wavelength selective devices.

According to examples of the present disclosure, the wavelength identification and analysis sensor may provide a sensor and/or an associated method to identify the wavelength of a wavelength division multiplexing system from a common multi-colored input or output, using multi-wavelength or tunable optical reflectometry, by transmitting different wavelengths and detecting, in the returned signals, the contribution from a high reflective event or a long length fiber (e.g., a relatively extended length fiber) connected to a far end of an input or output of a wavelength selective device (or a channel under test).

According to examples of the present disclosure, the wavelength identification and analysis sensor may provide a single end sensor and/or an associated method to identify the wavelength of an in service wavelength division multiplexing system from a colored branch of a de-multiplexing device, using multi-wavelength or tunable optical reflectometry, by transmitting different wavelengths and analyzing returned signals from over a distance location of wavelength selective devices.

According to examples of the present disclosure, the wavelength identification and analysis sensor and associated method may identify the wavelength from a fiber connected to a wavelength division multiplexing system. The wavelength identification and analysis sensor and associated method may be applied in the form of a dedicated instrument as a single-end WDM channel analyzer (SEWCA), as an additional feature of a multi-wavelength or wavelength tunable optical reflectometer, as an additional embedded feature in a telecom equipment, in an optical transceiver, etc. With respect to multi-wavelength or wavelength tunable optical reflectometers that provide access to a return signal versus time or distance, such reflectometers may include pulse optical time domain reflectometers, optical frequency domain reflectometers, correlation optical reflectometers or coherent detection reflectometers, embedded optical reflectometers, broadband source and tunable filter receiver optical reflectometers, and the like.

With respect to wavelength selected devices that include, for example, a multiplexer (Mux), de-multiplexer (DeMux), etc., centered at frequencies corresponding to standardized channel grids, the wavelength identification and analysis sensor may identify the channel reference within the WDM grid.

With respect to wavelength selected devices that include, for example, a multiplexer (Mux), de-multiplexer (DeMux), etc., not centered at frequencies corresponding to standardized channel grids, the wavelength identification and analysis sensor may identify the effective wavelength of the channel under test.

If the optical frequency resolution of a multi-wavelength or tunable source is significantly better than the channel bandwidth, the wavelength identification and analysis sensor may return the spectral profile of the closest wavelength selective device (e.g., multiplexer or de-multiplexer).

The wavelength identification and analysis sensor may identify an active wavelength in the presence of optical power received from a distant WDM source (e.g., in a counter-propagation mode).

With respect to WDM, WDM may increase the carrying capacity of a physical medium (e.g., an optical fiber) by using multiple optical frequencies on the same fiber. A WDM system may use a multiplexer at a transmitter to join together several signals at different wavelengths and a de-multiplexer at a receiver to split the signals apart. In bi-directional configurations, transmitters and receivers may be on different sides of a WDM network. In this regard, FIG. 1 illustrates an architecture of a WDM network 100 including receivers located on the same side, according to an example of the present disclosure. Referring to FIG. 1, the WDM network 100 may connect transmitters 102 to receivers 104. For the input at wavelength λ1, transmitter 106 may be connected to receiver 108 through optical fiber 110, multiplexer 112, common fiber 114, de-multiplexer 116, and finally optical fiber 118.

WDM configurations may depend on factors such as a number of wavelengths, allocated wavelength ranges, wavelength spacing, spectral width, etc. Compared to WDM which may generally include two or a few wavelengths, CWDM may offer up to 18 wavelengths from 1270 nm to 1610 nm with 20 nm wavelengths spacing, and DWDM may offer even more wavelengths (e.g., 40, 80 and even more) on a relatively small wavelength range due to a smaller wavelength spacing such as 100 gigahertz (GHz), 50 GHz, and even less.

Referring again to FIG. 1, even though FIG. 1 illustrates an architecture of a WDM network including receivers located on the same side, the configuration of FIG. 1 may be modified to include bi-directional transmission, or a more complex configuration with DWDM inside CWDM, WDM on PON, etc. In these cases, the intrinsic structure of WDM may need to connect a transmitter (e.g., the transmitter 106) and receivers (e.g., the receiver 108) that operate at the same wavelength. Any wavelength mismatch may block the optical path. The multiplexer 112 and the de-multiplexer 116 may represent wavelength selective devices that need to be correctly connected respectively to an optical source and optical receivers.

Figure 2:
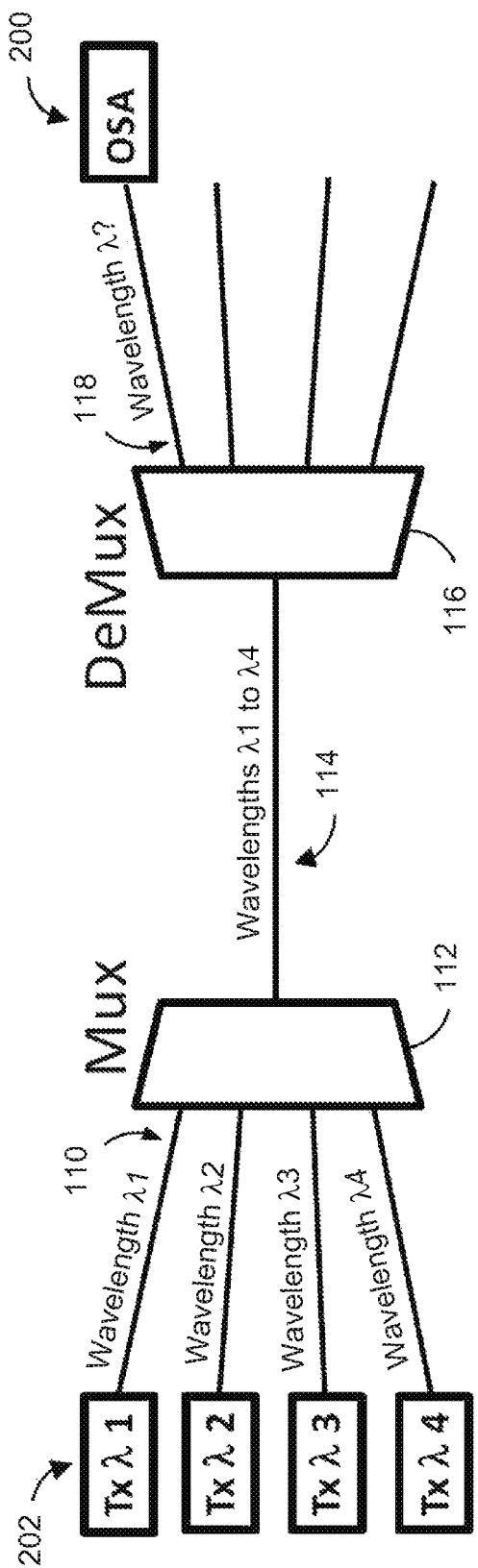
FIG. 2 illustrates an architecture of a WDM network for which wavelength identification may be performed by measuring the spectrum of the light at a receiver side, where a signal is emitted from transmitters, according to an example of the present disclosure.
Figure 3:
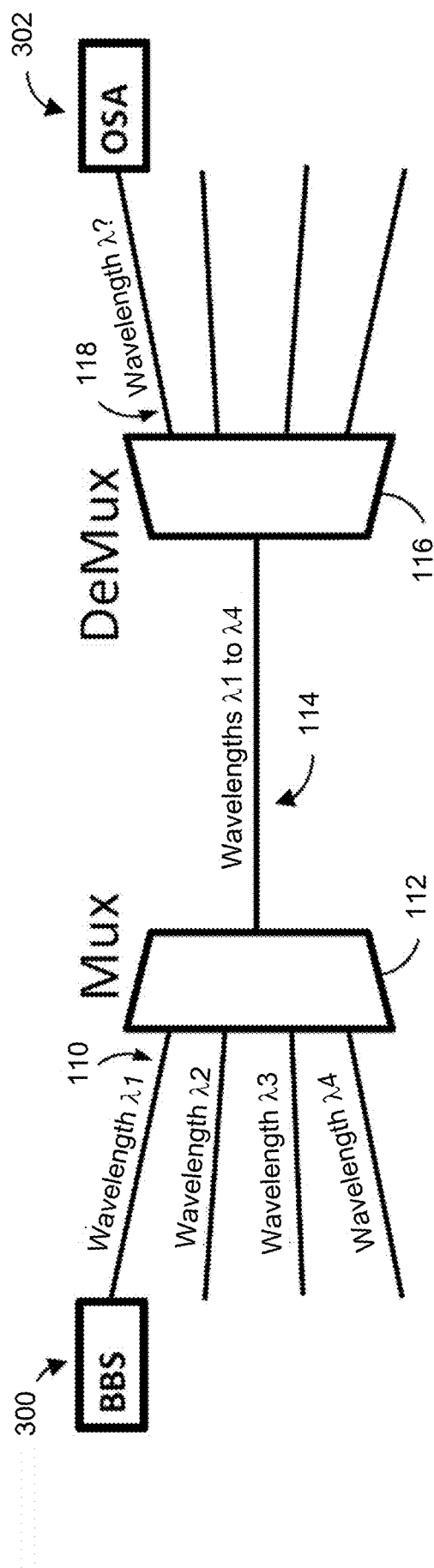
FIG. 3 illustrates an architecture of a WDM network for which wavelength identification may be performed by measuring the spectrum of the light at a receiver side, where a signal is emitted using an external optical source, according to an example of the present disclosure.

FIG. 2 illustrates an architecture of a WDM network for which wavelength identification may be performed by measuring the spectrum of the light at a receiver side, where a signal is emitted from transmitters, according to an example of the present disclosure. FIG. 3 illustrates an architecture of a WDM network for which wavelength identification may be performed by measuring the spectrum of the light at a receiver side, where a signal is emitted using an external optical source, according to an example of the present disclosure. With respect to the configuration of FIG. 2, the transmitters may be connected to the network and operate with optical power emitted into the WDM network. With respect to the configuration of FIG. 3, two external test equipment including the external optical source 300 and the optical spectrum analyzer 302 may be installed on both ends of the network under test.

With respect to FIGS. 2 and 3, the wavelength identification may be performed by measuring the spectrum of the light at the receiver side using an optical spectrum analyzer (OSA) 200 (or a wavelength meter, an optical wavelength monitoring device or the like). For this purpose, a signal may be emitted from each transmitter 202 (see FIG. 2) or using an external optical source 300 (e.g., a Broad Band Source (BBS)) as shown in FIG. 3) if measuring from the transmitter side (in co-propagation with the traffic signal direction). In counter-propagation, referring to FIG. 3, the external optical source 300 and the optical spectrum analyzer 302 may be interchanged. The external optical source 300 may also be replaced by a multi-wavelength source aligned on the WDM wavelengths.

WDM test with optical reflectometers may utilize multi-wavelength instruments. For example, the optical reflectometer may embed a multi-wavelength or tunable source and a large band receiver. Alternatively, the optical reflectometer may embed a broadband source and a multi-wavelength selective or wavelength tunable filter on a receiver side.

Figure 4A:
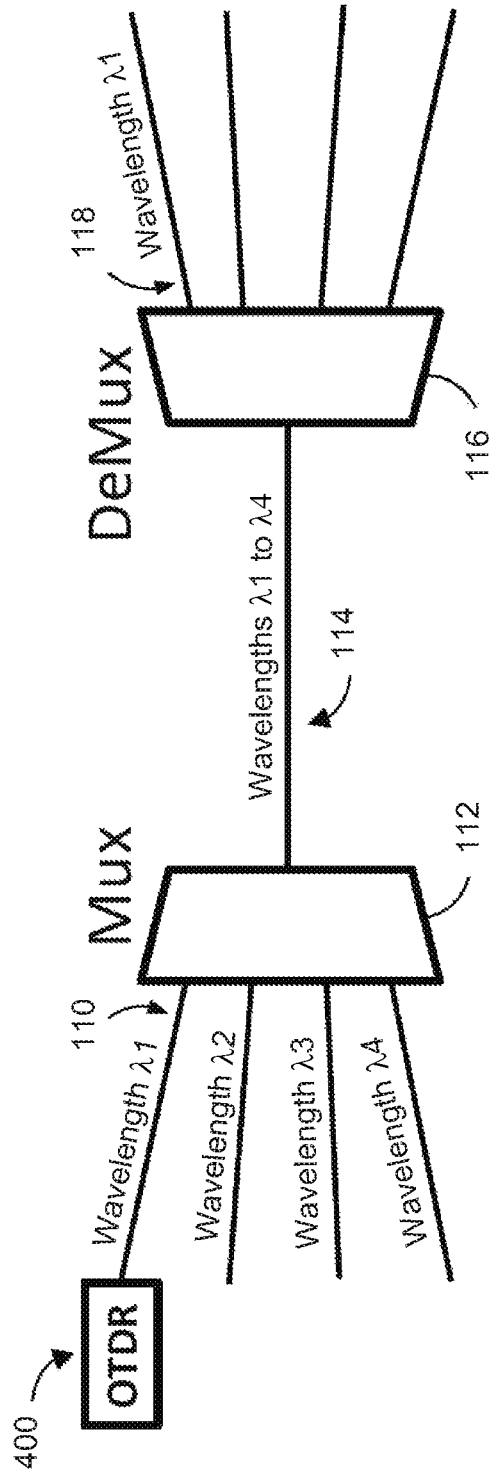
FIG. 4A illustrates a test configuration of a WDM network using an optical time-domain reflectometer (OTDR)
Figure 4B:
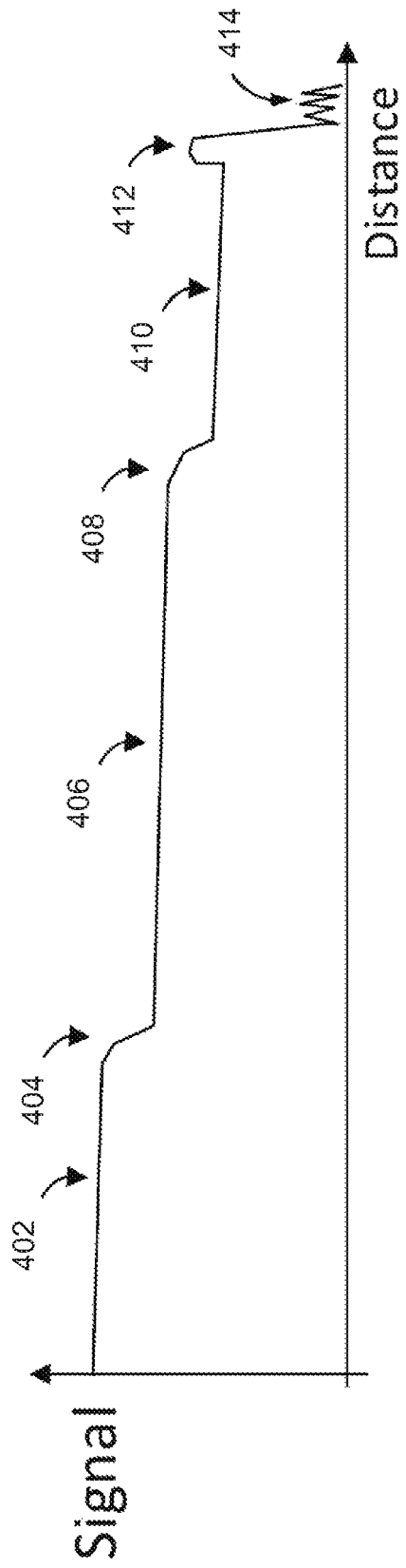
FIG. 4B illustrates a trace of an optical reflectometer that combines contribution of backscatter signal from fibers and back reflected signal from in line reflective events, according to an example of the present disclosure.

FIG. 4A illustrates a test configuration of a WDM network using an OTDR, and FIG. 4B illustrates a trace of an optical reflectometer that combines contribution of backscatter signal from fibers and back reflected signal from in line reflective events, according to an example of the present disclosure.

An OTDR is an optoelectronic instrument used to characterize an optical fiber. The OTDR may inject a series of optical pulses into an optical fiber under test. Based on the injected optical pulses, the OTDR may extract, from the same end of the optical fiber in which the optical pulses are injected, light that is scattered or reflected back from points along the optical fiber. The scattered or reflected light that is gathered back may be used to characterize the optical fiber. For example, the scattered or reflected light that is gathered back may be used to detect, locate, and measure events at any location of the optical fiber. The events may include faults at any location of the optical fiber. Other types of features that may be measured by the OTDR include attenuation uniformity and attenuation rate, segment length, and location and insertion loss of connectors and splices.

Referring to FIG. 4A, an OTDR 400 may be connected by the optical fiber 110 to the WDM network on the channel under test (ChUT). With respect to FIG. 4B, the in line reflective events may be associated with optical connectors, fiber ends, and the like.

Referring to FIG. 4B, section 402 may represent the return signal from the fiber connected upstream of the multiplexer 112. Event 404 may correspond to the multiplexer distance location. Section 406 may correspond to the main fiber that transmits all of the different wavelengths. Event 408 may correspond to the de-multiplexer 116 distance location. Section 410 may represent the fiber downstream of the de-multiplexer. Event 412 may correspond to a reflective end-of-fiber event (e.g., an optical connector). Event 414 may correspond to a noise level following the end-of-fiber event.

When testing several inputs/outputs of the multiplexer 112, the optical reflectometer may need to be set-up to the corresponding wavelength before starting a measurement. The set-up of the wavelength, frequency, or wavelength reference may move to the next wavelength in a predefined order, but may not avoid wavelength mismatch due to factors such as wavelength physical identification, or labeling errors. In addition, the set-up of the wavelength, frequency, or wavelength reference may add constraints that may need to be followed in a predefined order with associated risks.

FIGS. 5A and 5B illustrate wavelength mismatch between an optical reflectometer signal and an input of a multiplexer (or a channel under test), where the signal of the optical reflectometer is blocked or strongly attenuated by the multiplexer, according to an example of the present disclosure. Referring to FIGS. 5A and 5B, in the case of wavelength mismatch between an optical reflectometer 500 signal and the channel under test, the signal of the optical reflectometer may be blocked or strongly attenuated by the multiplexer 112. In such a case, the return signal by the fiber section 502 upstream of the multiplexer 112 may not be affected. After the event corresponding to the multiplexer 112, the signal displayed at 506 may include the noise floor of the optical reflectometer. In some case, a residual signal (not shown) may be seen after the multiplexer distance if the optical reflectometer has sufficient dynamic range to support a large insertion loss due to wavelength mismatch. For example, considering a CWDM including 18 wavelengths with an insertion loss of 3.5 dB max in the wavelength pass band and an isolation of 30 dB min from the other wavelengths, the optical signal return after the wavelength selective device in case of wavelength mismatch may drop by more than 26.5 dB.

With respect to FIGS. 5A and 5B, in case of an optical connection issue (e.g., a high insertion loss connection, a fiber bend, or a fiber break) at the input of a wavelength selective device, the corresponding return signal may look very similar to the signal showing wavelengths mismatch. In both cases, a relatively significant signal drop may be seen at 504 after the wavelength selective device (e.g., multiplexer 112).

FIG. 6A illustrates an architecture of a wavelength identification and analysis sensor 600 (hereinafter also referred to as "sensor 600"), and FIG. 6B illustrates detection of wavelength mismatch by measuring the signal amplitude at one point and comparing the amplitudes, according to an example of the present disclosure.

With respect to FIG. 6A, the sensor 600 may return wavelength based on detection of a wavelength mismatch between a test wavelength and an effective wavelength of an input or output (e.g., associated with one of the inputs/outputs designated "Wavelength λ1", "Wavelength λ2", etc.) of a WDM network 602. The wavelength mismatch may be measured by transmitting, by a wavelength transmitter 604, a range (e.g., all or a defined range) of wavelengths, and analyzing, by a wavelength analyzer 620, the returned signals from over (i.e., beyond) a distance 606 (see FIG. 6B) of the first wavelength selective device 608. For example, the wavelength transmitter 604 may be operably connectable to an input or output of the wavelength selective device 608 of the WDM network 602 to transmit test signals on a plurality of wavelengths into the input or output of the wavelength selective device of the WDM network. According to an example, the plurality of wavelengths correspond to a plurality of central wavelengths of a channel plan.

The wavelength analyzer 620 may detect returned signals from the input or output of the wavelength selective device 608 of the WDM network 602, with each returned signal being associated with one of the transmitted test signals. Further, the wavelength analyzer 620 may analyze the returned signals and identify, based on the analysis of the returned signals, a wavelength associated with the input or output of the wavelength selective device 608 of the WDM network 602. In this regard, the wavelength analyzer 620 may analyze, based on the transmitting of the range of wavelengths, returned signals from beyond a specified distance (e.g., the distance 606) associated with the wavelength transmitter 604 and a wavelength selective device of the WDM network 602, and identify, based on the analysis of the returned signals, a wavelength associated with the input or output of the WDM network 602. According to an example, the wavelength analyzer 620 may analyze the returned signals by detecting wavelength mismatches between the plurality of wavelengths and wavelengths of corresponding return signals of the returned signals.

According to an example, the wavelength transmitter 604 may include the transmitting functionality of a multi-wavelength or tunable optical reflectometer.

A sensor controller 610 may be communicatively connected to components of the sensor 600 to control operations of the components. For example, the sensor controller 610 may adjust a wavelength of the wavelength identification and analysis sensor 600 to correspond to the wavelength associated with the input or output of the wavelength selective device 608 of the WDM network 602. The first wavelength selective device 608 may include the wavelength multiplexer as shown in FIG. 6A or a de-multiplexer.

In order to detect the wavelength mismatch, the analysis of the return signal at the different wavelengths from over the distance $d_{wsd}$ (i.e., beyond the distance 606) after the extinction of the signal contribution due to the first wavelength selective device 608 may be performed, for example, by measuring the signal amplitude 612 at one point and comparing the amplitude to a threshold (e.g., a specified amplitude threshold). That is, the wavelength analyzer 620 may identify a wavelength of the plurality of wavelengths for which an amplitude corresponding to a wavelength mismatch of the wavelength mismatches is less than a specified amplitude threshold, and designate the wavelength of the plurality of wavelengths for which the amplitude corresponding to the wavelength mismatch of the wavelength mismatches is less than the specified amplitude threshold as the wavelength associated with the input or output of the wavelength selective device 608 of the WDM network 602. For example, the wavelength that is to be identified (e.g., Wavelength λ2 associated with $A_{\lambda 2}$ for the example of FIG. 6A) may include a highest amplitude (e.g., at 614; also designated $d_{ath}$), where the amplitude exceeds amplitudes of the other wavelengths by a defined difference threshold $\Delta_{Ath}$ that accounts for the difference between matching (e.g., at 614) and mismatching (e.g., at 616) conditions. The minimum distance $d_{wsd}$ (e.g., the distance 606) may be defined by taking into account the signal tailing at 618, and waiting for the end of this transitory phenomena before measuring the signal amplitude. With respect to the previous example of an 18 wavelength CWDM, the difference of amplitudes between $A_{\lambda 2}$ (the wavelength in the matching condition) and $A_\lambda$ (amplitudes of any of the other mismatching conditions) is approximately 26.5 dB. In this case, a threshold $\Delta_{Ath}$ (defined as a difference between $A_{\lambda 2}$ and the threshold $A_{th}$) of approximately 15 dB on the difference of amplitudes may be specified to differentiate the matching wavelength (e.g., Wavelength λ2) from the other wavelengths (e.g., Wavelength λ1, Wavelength λ3, and Wavelength λ4). Further, the minimum distance $d_{wsd}$ may be determined by an automated event detection feature of the sensor 600.

The measurement location from over the distance $d_{wsd}$ may be extended to more than one point, for example, to improve the quality of the amplitude measurement in presence of noise. For example, the measurement on a trace may be performed using one sample or multiple samples at different distances. For example, the amplitude may be averaged from a plurality of points (e.g., 10 points) distributed along the length of the trace, and/or the contribution along a length of the trace may be integrated from a section of fiber (e.g., optical return loss measurement).

For a defined network use case, an absolute value threshold $A_{th}$ (e.g., a specified absolute value amplitude threshold) may also be set to identify a wavelength, where the wavelength to be identified would be the wavelength that includes an amplitude greater than $A_{th}$. For example, the wavelength analyzer 620 may identify a wavelength of the plurality of wavelengths for which an amplitude measured from beyond a specified distance (i.e., beyond the distance 606) is greater than a specified absolute value amplitude threshold (i.e., $A_{th}$), and designate the wavelength of the plurality of wavelengths for which the amplitude measured from beyond the specified distance is greater than the specified absolute value amplitude threshold as the wavelength associated with the input or output of the wavelength selective device 608 of the WDM network 602.

Figure 7:
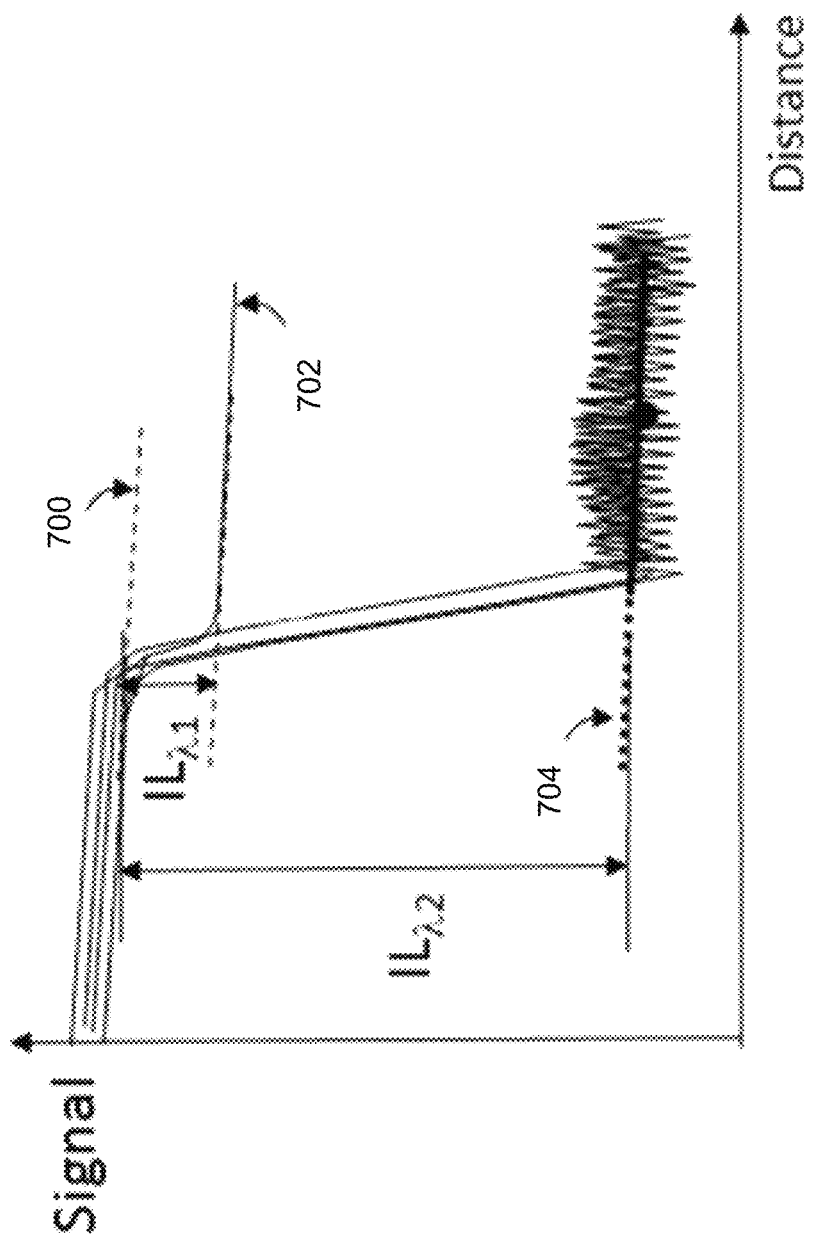
FIG. 7 illustrates detection of wavelength mismatch for the wavelength identification and analysis sensor of FIG. 6A by measuring the insertion loss of a wavelength selective device at different wavelengths, according to an example of the present disclosure.

FIG. 7 illustrates detection of wavelength mismatch for the sensor 600 of FIG. 6A by measuring the insertion loss of a wavelength selective device at different wavelengths, according to an example of the present disclosure. The insertion loss may represent the optical power loss introduced by inserting a device, such as a multiplexer (e.g., the first wavelength selective device 608) as shown in FIG. 6A, or a de-multiplexer, expressed in dB. The insertion loss may be measured by using techniques such as 2-points, 5-points, etc. The 2-points technique may include comparison of the signal amplitude on a trace at one point location just before the device location, and a second point location after the device location. The 5-points technique may include extrapolation of the fiber linear traces sections on both sides of an event using a least squares approximation (LSA) technique.

With respect to FIG. 7 and Wavelength λ1, a least squares approximation applied before the event at 700 and after the event at 702 may be used to measure insertion loss ($IL_{\lambda 1}$) of the wavelength selective device (e.g., the multiplexer of FIG. 6A). In the same manner, with respect to $IL_{\lambda 2}$, which represents the insertion loss at λ2, one of the mismatching wavelengths may be evaluated using the same technique. Further, the noise level of the trace may limit the use of least squares approximation as shown at 704.

Figure 8A:
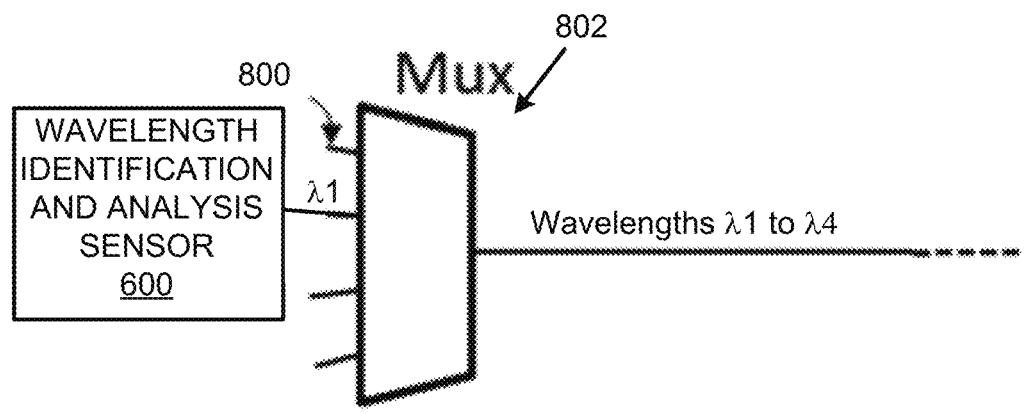
FIG. 8A illustrates a WDM network configuration for the wavelength identification and analysis sensor of FIG. 6A including short fiber section lengths connected to colored inputs of wavelength selective devices.
Figure 8B:
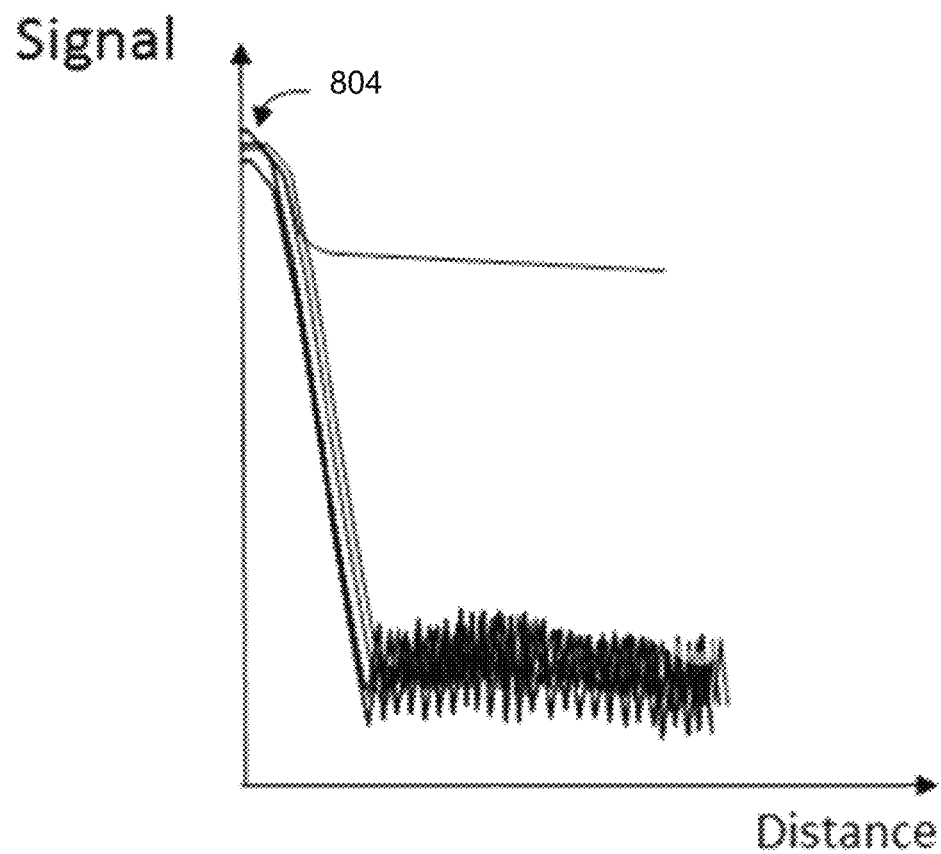
FIG. 8B illustrates a signal before a wavelength reflective device, according to an example of the present disclosure.

FIG. 8A illustrates a WDM network configuration for the sensor 600 of FIG. 6A including short fiber section lengths connected to colored inputs of wavelength selective devices, and FIG. 8B illustrates a signal before a wavelength reflective device, according to an example of the present disclosure. Referring to FIG. 8A, compared to the configuration of FIG. 6A, WDM network configurations may include short fiber section lengths as shown at 800 connected to colored inputs of wavelength selective devices (e.g., a multiplexer 802). In this case, as shown at location 804 of FIG. 8B, the signal before the wavelength selective device (e.g., the multiplexer 802) may not be accessible. Thus, compared to FIG. 7, a least squares approximation may not be applicable to this relatively short fiber section. Instead, other insertion loss techniques such as a 2-points technique may be used in such cases. For example, in case of an optical connection issue (e.g., a high insertion loss connection, a fiber bend, or a fiber break) between the sensor 600 and the input of a wavelength selective device, the corresponding return signal may look very similar to the signal showing wavelength mismatch.

As discussed above, the wavelength identification and analysis sensor 600 of FIG. 6A and associated method may be applied in the form of a dedicated instrument as a single-end WDM wavelength analyzer, as an additional feature of a multi-wavelength or wavelength tunable optical reflectometer, as an additional embedded feature in a telecom equipment, in an optical transceiver, etc.

Figure 9A:
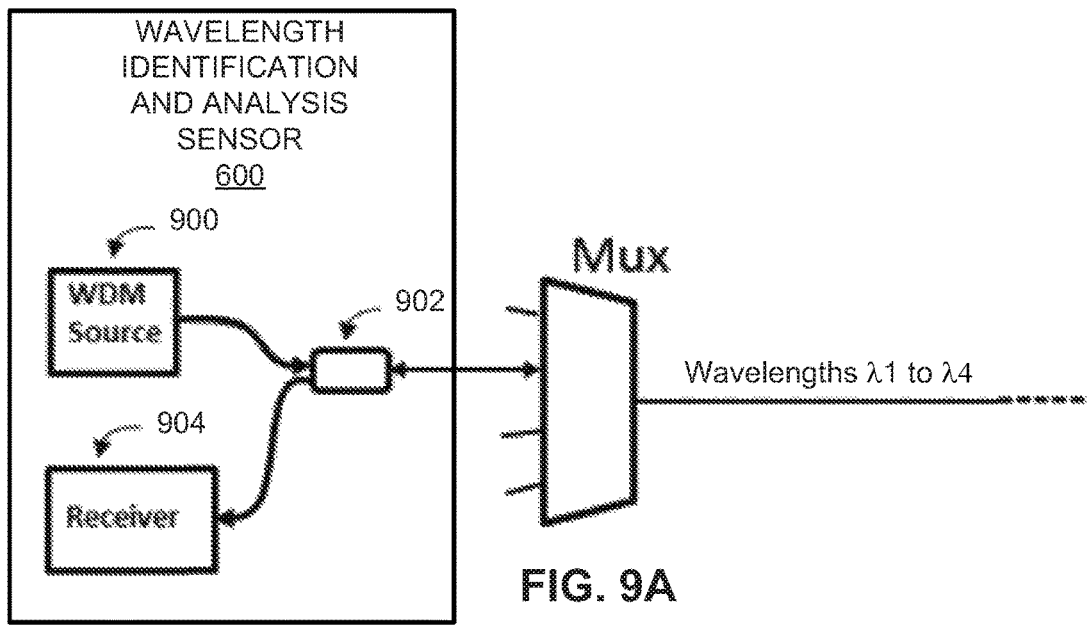
FIG. 9A illustrates application of the wavelength identification and analysis sensor of FIG. 6A as a multi-wavelength optical pulse generator, an optical coupler, and an optical receiver with a data acquisition system.
Figure 9B:
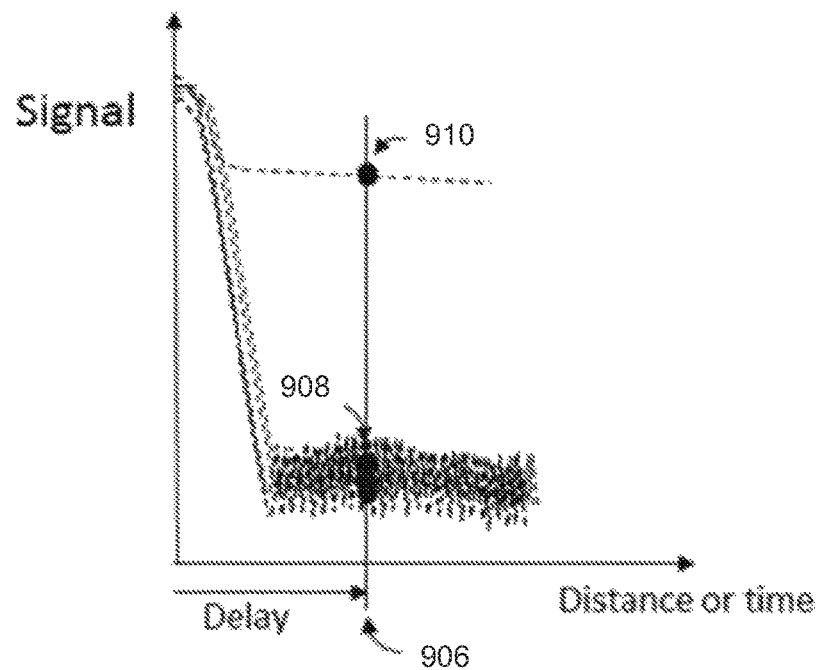
FIG. 9B illustrates sampling of one point of the return trace after a defined delay, according to an example of the present disclosure.

In this regard, FIG. 9A illustrates application of the sensor 600 of FIG. 6A as a multi-wavelength optical pulse generator, an optical coupler, and an optical receiver with a data acquisition system, and FIG. 9B illustrates sampling of one point of the return trace after a defined delay, according to an example of the present disclosure. For example, as an example of a dedicated instrument, the sensor 600 may be applied as a multi-wavelength optical pulse generator 900, optical coupler 902, and an optical receiver 904 with a data acquisition system sampling one point of the return trace after a defined delay 906. In this regard, data corresponding to points 908 and point 910 corresponding to acquisitions at different wavelengths may be used as discussed above to identify a matching wavelength. The defined delay may be determined by an automated event detection feature of the sensor 600.

Figure 10A:
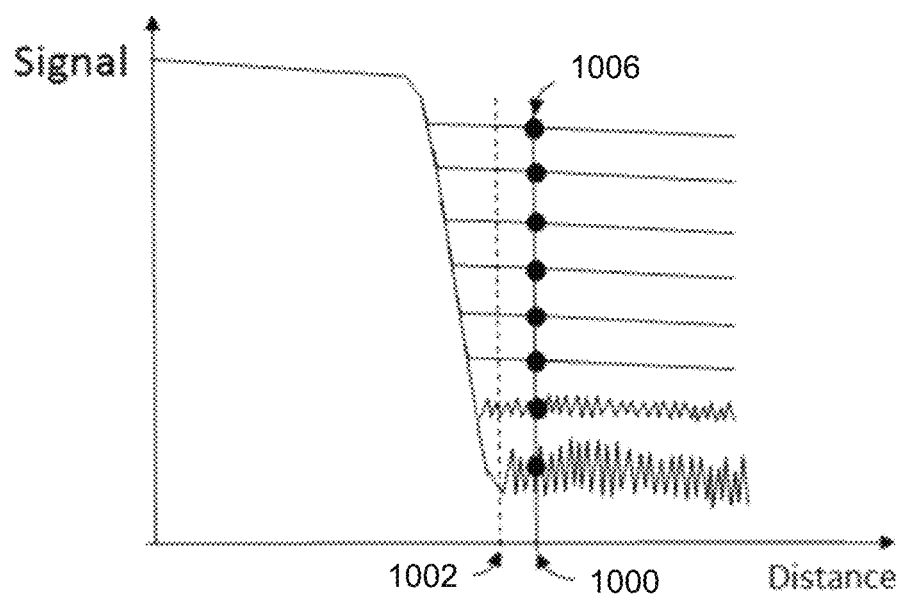
FIG. 10A illustrates return signals when sampling wavelengths around a channel bandwidth.
Figure 10B:
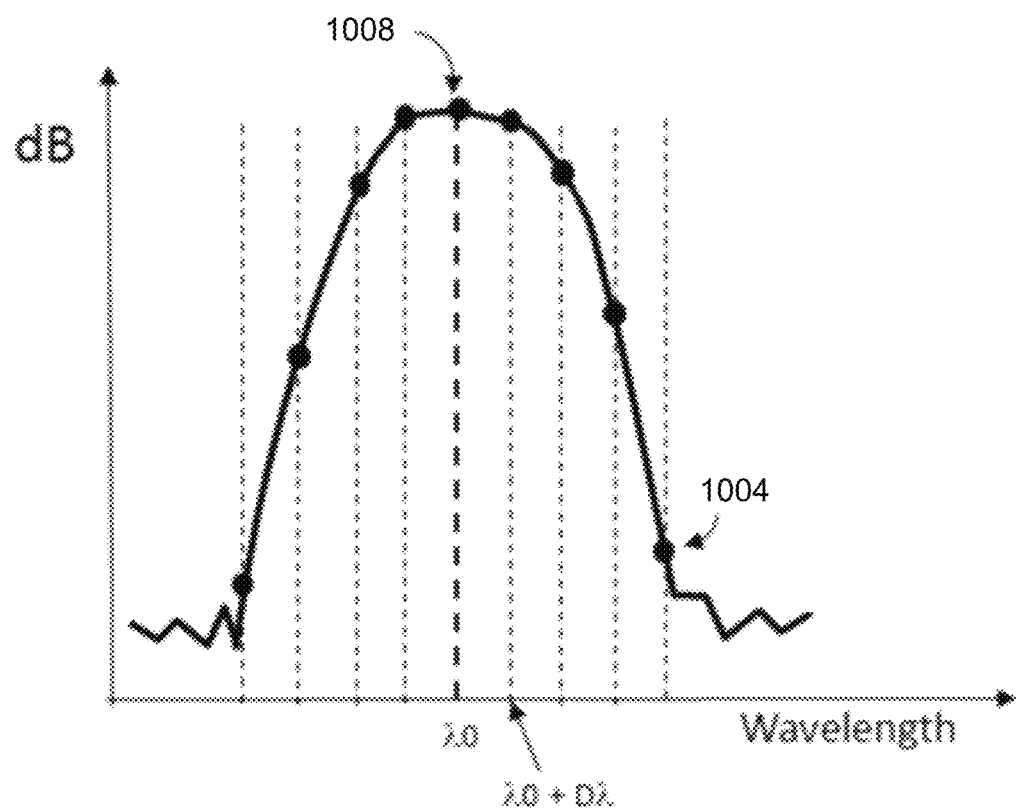
FIG. 10B illustrates application of the wavelength identification and analysis sensor of FIG. 6A to transmitting a wavelength with a wavelength sampling resolution smaller the channel bandwidth and translating a wavelength dependent amplitude to data points of the spectral profile of the associated channel, according to an example of the present disclosure.

As discussed above, the wavelength identification and analysis sensor 600 of FIG. 6A and associated method may be applied in the form of a dedicated instrument as a single-end WDM wavelength analyzer. In this regard, with respect to the single-end single instrument spectral analysis capability of the sensor 600, FIG. 10A illustrates return signals when sampling wavelengths around a channel bandwidth, according to an example of the present disclosure. Further, FIG. 10B illustrates application of the sensor 600 for transmitting a wavelength with a wavelength sampling resolution smaller than the channel bandwidth and translation of a wavelength dependent amplitude to data points of the spectral profile of the associated wavelength, according to an example of the present disclosure. For example, the sensor 600 may be applied using an optical wavelength sampling period shorter than an optical bandwidth of a WDM wavelength. In such a case, the return signal may be used to trace the spectrum profile of a wavelength selective device. In order to avoid distortion of the spectral profile due to wavelength dependency of the scattering and backscattering phenomena, referring to FIGS. 10A and 10B, the distance 1000 after the wavelength selective device may need to be as close as possible to the minimum distance 1002, where the minimum distance 1002 corresponds to the distance $d_{wsd}$ (e.g., the distance 606) of FIG. 6B. Further, signal amplitude 1004 decreases from the maximum amplitude 1006 (see also point 1008) corresponding to increasing distance from the maximum amplitude point.

Based on such a wavelength (or optical frequency) resolution, the sensor 600 may add to optical domain reflectometers a spectral analyzer capability in a single end measurement, without the need to connect a broadband source on the other side of a WDM network (e.g., to a de-multiplexer in the example of FIG. 6A). Further, the single end measurement capability implemented by the sensor 600 provides for characterization of the closest wavelength selective device without the need to disconnect the multiplexer to de-multiplexer, or de-multiplexer to multiplexer connection. These features also provide for the automatic alignment of a transceiver of a wavelength tunable optical reflectometer on the real spectral profile of a WDM wavelength.

Figure 11:
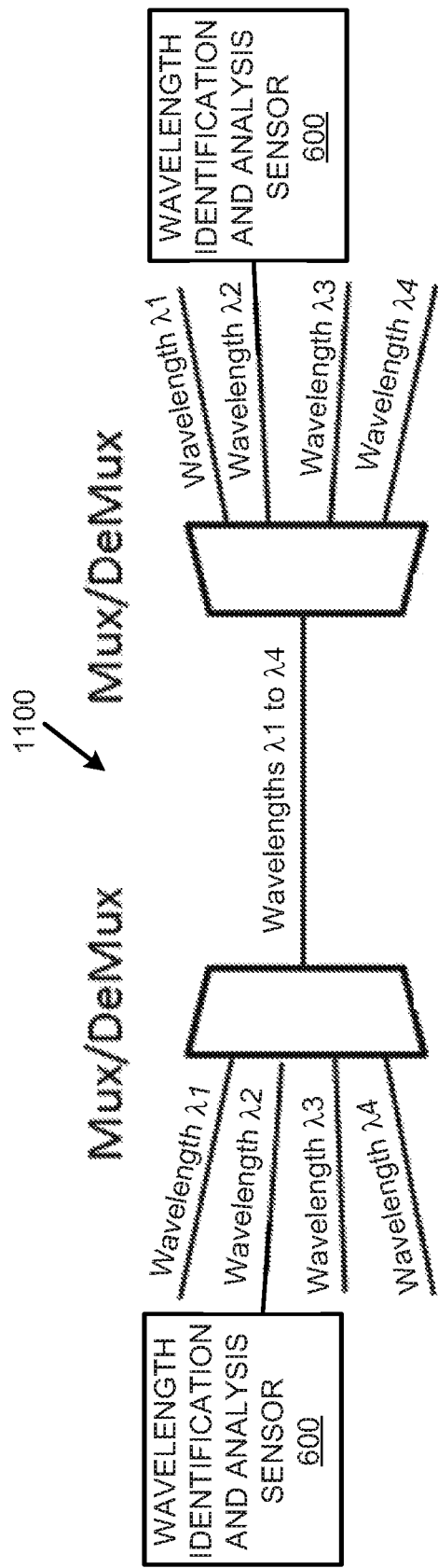
FIG. 11 illustrates a set-up of the wavelength identification and analysis sensor of FIG. 6A for end-to-end spectral analysis, according to an example of the present disclosure.

FIG. 11 illustrates a set-up of the sensor 600 of FIG. 6A for end-to-end spectral analysis, according to an example of the present disclosure. As shown in FIG. 11, with respect to the end-to-end spectral analysis capability of the sensor 600, two single-end sensors 600 may be used on each side of a WDM network 1100 to analyze the spectral profile of wavelength selective devices in a serial mode. Based on the analysis of the spectral profile of wavelength selective devices, the combined contribution of each of the wavelength selective devices may be determined.

For example, referring to FIG. 11, sensors 600 may be connected to the same wavelength (e.g., Wavelength λ2) on each side of the WDM network 1100. After connection of the sensors 600, each sensor may be used to sequentially measure the spectral profile on the closest wavelength selective device. The results of the measurement of the spectral profile may be combined to determine an overall channel profile.

Figure 12A:
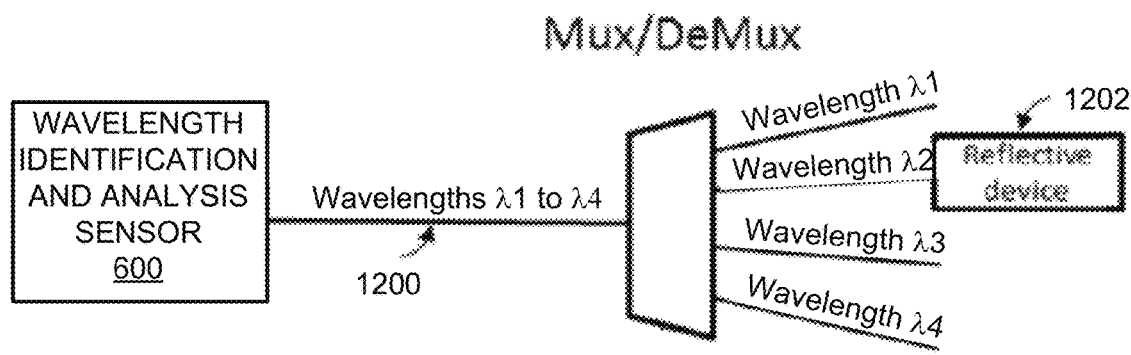
FIG. 12A illustrates single-end WDM wavelength identification for the wavelength identification and analysis sensor of FIG. 6A from a common multi-wavelength optical input or output.
Figure 12B:
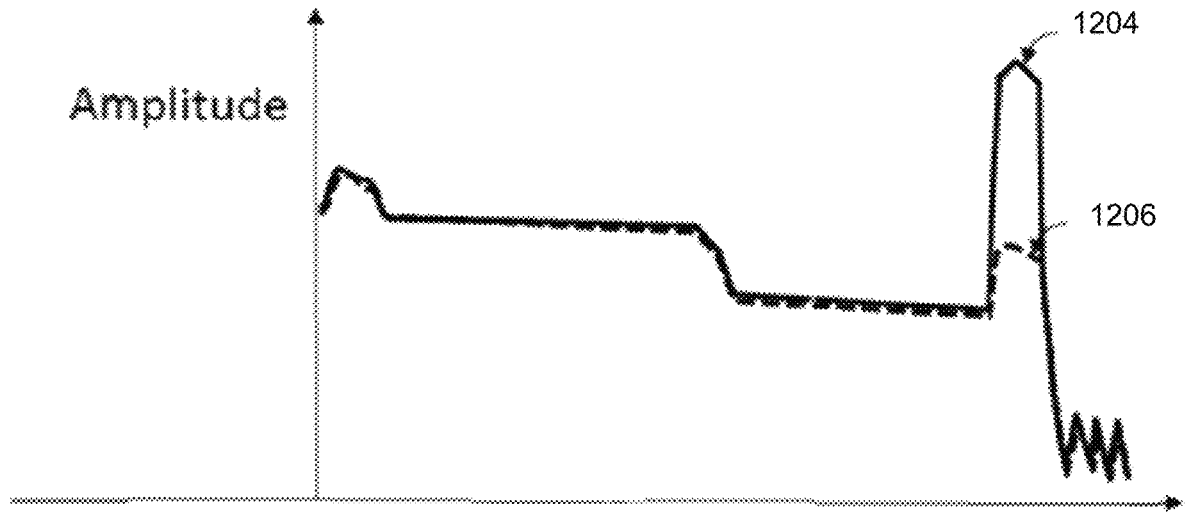
FIG. 12B illustrates a return signal showing a high reflectance at its end to confirm a matching condition of the marked channel under test, according to an example of the present disclosure.

With respect to wavelength identification from a common input or output of a wavelength selective device, FIG. 12A illustrates single-end WDM wavelength identification for the sensor 600 of FIG. 6A from a common multi-wavelength optical input or output, and FIG. 12B illustrates a return signal showing a high reflectance at its end to confirm a matching condition of the marked channel under test, according to an example of the present disclosure.

Referring to FIGS. 12A and 12B, single-end WDM wavelength identification may be performed by the sensor 600 from a common multi-wavelength optical input or output 1200 adding a non-wavelength sensitive high reflective device 1202 (also referred to as "non-wavelength sensitive reflectivity device") to mark the fiber end of the channel under test. With this arrangement, when transmitting a wavelength, a return signal showing a relatively higher reflectance (also referred to as "reflectance amplitude") at its end 1204 (with the high reflective device 1202) compared to end 1206 (without any high reflective device) may be used to confirm the matching condition of the marked channel under test. The reflectance of the reflective device 1202 may be specified to be relatively high in comparison to the reflectance that may be generated by network elements such as fiber cuts, connectors, etc. For example, a reflective device of a reflectance of approximately 0 dB (e.g., a mirror) may be detected among other reflective devices assumed to show reflectance values at −12 dB maximum or lower. In this regard, assuming that a reflective device includes a reflectance of approximately 0 dB, a threshold of −6 dB may be specified to differentiate between a reflective condition (e.g., at end 1204) and a non-reflective condition (e.g., at end 1206). If the sensor 600 does not determine the reflectance of the reflective device 1202, a threshold may be directly applied on the difference between the peak amplitude of reflective events.

Referring to FIGS. 12A and 12B, according to an example, the reflective device 1202 may be replaced by any other device capable of generating significant differences between wavelength matching and mismatching conditions. For example, an additional length of fiber may be used to differentiate the channel under test by its overall length.

Referring again to FIGS. 1 and 6A, with respect to out-of-service and in-service wavelength identification, when the sensor 600 is connected to the receiver side of the WDM network (i.e., the de-multiplexer side) with the transceiver connected to the far end (i.e., the multiplexer end), the sensor 600 may receive optical power during wavelength identification. In this case, the sensor 600 may detect presence of a signal on its receiver, and the sensor 600 may adjust its sensibility to still differentiate wavelength matching from mismatching. With respect to wavelength identification, the performances needed for attenuation linearity and measurement accuracy may be below the performances needed for fiber characterization. Thus, wavelength identification by the sensor 600 may accommodate power received from the far end, and continue to operate on the active fiber.

With respect to automated and smart WDM network characterization, the sensor 600 may be applied for fiber characterization of a WDM network to automate wavelength, frequency, and/or channel reference set-up before beginning of fiber characterization measurement of each wavelength. In this regard, the sensor 600 may be connected to a WDM network, and an automated wavelength identification mode of the sensor 600 may be launched to automatically configure a test wavelength to be used for fiber characterization of a WDM channel under test.

With respect to limiting the time duration of wavelength transmission, operation of the sensor 600 may utilize less time with respect to wavelength identification signal acquisition compared to characterization of a fiber link. For example, a sensor 600 fiber link measurement may be performed with an acquisition time set to 30 or 60 s, while wavelength identification may take one or a few seconds per wavelength. In this regard, instead of transmitting all of the set of wavelengths, further operation of the sensor 600 may be stopped when the test criteria is passed based on the predefined threshold as discussed above. Further, the first wavelength to transmit to start with may be selected by considering the next wavelength in a defined order (e.g., an ascending wavelength reference order) to minimize the time needed to identify the wavelength of the input/output the sensor 600 is connected to.

FIGS. 13 and 14 respectively illustrate flowcharts of methods 1300 and 1400 for wavelength identification and analysis, according to examples. The methods 1300 and 1400 may be implemented on the wavelength identification and analysis sensor 600 described above with reference to FIGS. 1-12B by way of example and not limitation. The methods 1300 and 1400 may be practiced in other systems.

Referring to FIGS. 1-13, and particularly FIG. 13, at block 1302, the method 1300 may include transmitting (e.g., by the wavelength transmitter 604) test signals on a plurality of wavelengths into the input or output of the wavelength selective device (e.g., the multiplexer of FIG. 6A) of the WDM network (e.g., the WDM network 602 of FIG. 6A).

At block 1304, the method 1300 may include detecting (e.g., by the wavelength analyzer 620) returned signals from the input or output of the wavelength selective device of the WDM network, with each returned signal being associated with one of the transmitted test signals.

At block 1306, the method 1300 may include analyzing (e.g., by the wavelength analyzer 620) the returned signals by determining insertion loss values (e.g., see discussion above with respect to FIGS. 7, 8A, and 8B) associated with the returned signals.

At block 1308, the method 1300 may include identifying (e.g., by the wavelength analyzer 620), based on the analysis of the returned signals, a wavelength associated with the input or output of the wavelength selective device of the WDM network (e.g., see discussion above with respect to FIGS. 7, 8A, and 8B).

According to examples, for the method 1300, analyzing the returned signals by determining insertion loss values associated with the returned signals, and identifying, based on the analysis of the returned signals, the wavelength associated with the input or output of the wavelength selective device of the WDM network may further include determining whether the insertion loss values include a specified insertion loss of the wavelength selective device of the WDM network, and in response to a determination that the insertion loss values include the specified insertion loss of the wavelength selective device of the WDM network, identifying, from the plurality of wavelengths, a wavelength associated with the specified insertion loss as the wavelength associated with the input or output of the wavelength selective device of the WDM network.

According to examples, for the method 1300, analyzing the returned signals by determining insertion loss values associated with the returned signals may further include determining a length of an optical fiber connection to the wavelength selective device of the WDM network, and applying, based on the determined length of the optical fiber connection to the wavelength selective device of the WDM network, a 2-point technique, a 5-point technique, and/or a least squares approximation (LSA) technique to determine the insertion loss values associated with returned signals.

Referring to FIGS. 1-12B and 14, and particularly FIG. 14, at block 1402, the method 1400 may include transmitting (e.g., by the wavelength transmitter 604) test signals on a range of wavelengths into a channel under test of a WDM network (e.g., the WDM network 602 of FIG. 6A).

At block 1404, the method 1400 may include detecting (e.g., by the wavelength analyzer 620) returned signals for each of the transmitted test signals.

At block 1406, the method 1400 may include analyzing (e.g., by the wavelength analyzer 620) the returned signals.

At block 1408, the method 1400 may include identifying (e.g., by the wavelength analyzer 620), based on the analysis of the returned signals, a wavelength associated with the channel under test of the WDM network.

According to examples, for the method 1400, analyzing the returned signals, and identifying, based on the analysis of the returned signals, the wavelength associated with the channel under test of the WDM network may further include analyzing the returned signals generated from a non-wavelength sensitive reflectivity device that marks a fiber end of the channel under test by determining reflectance amplitudes associated with the returned signals, identifying, based on the analysis of the returned signals, a reflectance amplitude of the reflectance amplitudes that is relatively higher than other ones of the reflectance amplitudes, and designating a wavelength associated with the identified reflectance amplitude as the wavelength associated with the channel under test of the WDM network (e.g., see discussion above with respect to FIGS. 12A and 12B).

According to examples, the method 1400 may further include setting, based on the identified wavelength associated with the channel under test of the WDM network, a wavelength of an optical reflectometer connected to the channel under test of the WDM network.

According to examples, the method 1400 may further include measuring, based on the identified wavelength associated with the channel under test of the WDM network, an optical spectral profile of a wavelength selective device of the WDM network (e.g., see discussion above with respect to FIGS. 10A and 10B).

According to examples, for the method 1400, transmitting test signals on the range of wavelengths into the channel under test of the WDM network may further include transmitting, at an optical wavelength sampling period shorter than an optical bandwidth of a WDM channel, the range of wavelengths into the channel under test of the WDM network.

According to examples, for the method 1400, analyzing the returned signals may further include analyzing the returned signals generated from a relatively extended length fiber connected to a far end of the channel under test of the WDM network (e.g., see discussion above with respect to FIGS. 12A and 12B).

According to examples, for the method 1400, analyzing the returned signals may further include analyzing the returned signals from beyond a specified distance associated with a wavelength selective device of the WDM network (e.g., see discussion above with respect to FIGS. 6A and 6B).

FIG. 15 shows a computer system 1500 that may be used with the examples described herein. The computer system may represent a generic platform that includes components that may be in a server or another computer system. The computer system 1500 may be used as part of a platform for the sensor controller 610. The computer system 1500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1500 may include a processor 1502 that may implement or execute machine readable instructions performing some or all of the methods, functions and other processes described herein. Commands and data from the processor 1502 may be communicated over a communication bus 1504. The computer system may also include a main memory 1506, such as a random access memory (RAM), where the machine readable instructions and data for the processor 1502 may reside during runtime, and a secondary data storage 1508, which may be non-volatile and stores machine readable instructions and data. The memory and data storage are examples of computer readable mediums. The main memory 1506 may include the sensor controller 610 including machine readable instructions residing in the main memory 1506 during runtime and executed by the processor 1502.

The computer system 1500 may include an input/output (I/O) device 1510, such as a keyboard, a mouse, a display, etc. The computer system may include a network interface 1512 for connecting to a network. Other known electronic components may be added or substituted in the computer system.

The processor 1502 may be designated as a hardware processor. The processor 1502 may execute operations associated with various components of the wavelength identification and analysis sensor 600. For example, the processor 1502 may execute operations associated with the sensor controller 610, etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A wavelength identification and analysis sensor comprising:
    a wavelength transmitter, operably connectable to an input or output of a wavelength selective device of a wavelength division multiplex (WDM) network, to transmit test signals on a plurality of wavelengths into the input or output of the wavelength selective device of the WDM network; and
    a wavelength analyzer to:
        detect returned signals from the input or output of the wavelength selective device of the WDM network, each returned signal associated with one of the transmitted test signals;
        analyze the returned signals by determining insertion loss values associated with the returned signals; and
        identify, based on the analysis of the returned signals, a wavelength associated with the input or output of the wavelength selective device of the WDM network.

2. The wavelength identification and analysis sensor of claim 1, further comprising a sensor controller to:
    adjust a wavelength of the wavelength identification and analysis sensor to correspond to the wavelength associated with the input or output of the wavelength selective device of the WDM network.

3. The wavelength identification and analysis sensor of claim 1, wherein the wavelength selective device includes a multiplexer or a de-multiplexer.

4. The wavelength identification and analysis sensor of claim 1, wherein the wavelength associated with the input or output of the wavelength selective device of the WDM network corresponds to a central wavelength of a channel plan.

5. A wavelength identification and analysis sensor comprising:
a wavelength transmitter, operably connectable to an input or output of a wavelength selective device of a wavelength division multiplex (WDM) network, to transmit test signals on a plurality of wavelengths into the input or output of the wavelength selective device of the WDM network; and
a wavelength analyzer to:
detect returned signals from the input or output of the wavelength selective device of the WDM network, each returned signal associated with one of the transmitted test signals;
analyze the returned signals to identify a specified insertion loss value; and
identify, based on the analysis of the returned signals, a wavelength associated with the input or output of the wavelength selective device of the WDM network.

6. The wavelength identification and analysis sensor of claim 5, further comprising a sensor controller to:
adjust a wavelength of the wavelength identification and analysis sensor to correspond to the wavelength associated with the input or output of the wavelength selective device of the WDM network.

7. The wavelength identification and analysis sensor of claim 5, wherein the wavelength selective device includes a multiplexer or a de-multiplexer.

8. The wavelength identification and analysis sensor of claim 5, wherein the wavelength associated with the input or output of the wavelength selective device of the WDM network corresponds to a central wavelength of a channel plan.

9. The wavelength identification and analysis sensor of claim 5, wherein the wavelength analyzer is to analyze the returned signals to identify the specified insertion loss value by:
determining a length of an optical fiber connection to the wavelength selective device of the WDM network; and
applying, based on the determined length of the optical fiber connection to the wavelength selective device of the WDM network, at least one of a 2-point technique, a 5-point technique, or a least squares approximation (LSA) technique to identify the specified insertion loss value.

10. A method for wavelength identification and analysis, the method comprising:
transmitting test signals on a range of wavelengths into a channel under test of a wavelength division multiplex (WDM) network;
detecting returned signals for each of the transmitted test signals;
analyzing the returned signals to determine a length of an optical fiber connection to the wavelength selective device of the WDM network; and
identifying, based on the analysis of the returned signals, a wavelength associated with the channel under test of the WDM network.

11. The method for wavelength identification and analysis according to claim 10, further comprising:
setting, based on the identified wavelength associated with the channel under test of the WDM network, a wavelength of an optical reflectometer connected to the channel under test of the WDM network.

12. The method for wavelength identification and analysis according to claim 10, further comprising:
measuring, based on the identified wavelength associated with the channel under test of the WDM network, an optical spectral profile of a wavelength selective device of the WDM network.

13. The method for wavelength identification and analysis according to claim 10, wherein transmitting test signals on the range of wavelengths into the channel under test of the WDM network further comprises:
transmitting, at an optical wavelength sampling period shorter than an optical bandwidth of a WDM channel, the range of wavelengths into the channel under test of the WDM network.

14. The method for wavelength identification and analysis according to claim 12, wherein the wavelength selective device includes a multiplexer or a de-multiplexer.

* * * * *